(12) United States Patent
Visser

(10) Patent No.: US 6,178,730 B1
(45) Date of Patent: Jan. 30, 2001

(54) SINGLE SHAKER HEAD HARVESTING APPARATUS AND METHOD

(76) Inventor: Thomas R. Visser, 1052 S. Riverdale Ave., Avon Park, FL (US) 33825

(*) Notice: Under 35 U.S.C. 154(b), the term of this patent shall be extended for 0 days.

(21) Appl. No.: 09/315,572

(22) Filed: May 20, 1999

Related U.S. Application Data

(60) Provisional application No. 60/086,500, filed on May 22, 1998, provisional application No. 60/086,589, filed on May 22, 1998, and provisional application No. 60/086,614, filed on May 22, 1998.

(51) Int. Cl.⁷ .................................................. A01D 46/00
(52) U.S. Cl. .................... 56/340.1; 56/327.1; 56/328.1
(58) Field of Search ............................ 56/340.1, 328.1, 56/327.1, 330

(56) References Cited

U.S. PATENT DOCUMENTS

| | | |
|---|---|---|
| 3,142,144 | 7/1964 | Ronning . |
| 3,413,786 * | 12/1968 | Wehr .................................. 56/340.1 |
| 3,596,455 | 8/1971 | Adrian . |
| 3,624,991 | 12/1971 | Rickerd . |
| 3,636,688 | 1/1972 | Fontan et al. . |
| 3,653,195 | 4/1972 | Cochran . |
| 3,772,866 | 11/1973 | Sell . |
| 3,808,786 | 5/1974 | Beckens . |
| 3,936,994 | 2/1976 | Mortier et al. . |
| 4,014,160 | 3/1977 | Mecca . |
| 4,063,406 | 12/1977 | Burton . |
| 4,077,193 | 3/1978 | Diggs . |
| 4,212,148 * | 7/1980 | Brownlee ........................... 56/328.1 |
| 4,329,836 | 5/1982 | Scudder . |
| 4,341,062 | 7/1982 | Scudder . |
| 4,418,521 | 12/1983 | Orlando et al. . |
| 4,435,950 * | 3/1984 | Deux et al. ............................. 56/330 |
| 4,455,034 | 6/1984 | deGraff et al. . |
| 4,860,529 | 8/1989 | Peterson et al. . |
| 4,977,736 | 12/1990 | Price, Jr. . |
| 4,986,064 | 1/1991 | Ermacora . |
| 5,067,314 | 11/1991 | Burke . |
| 5,181,373 | 1/1993 | Littau . |
| 5,259,177 | 11/1993 | Windemuller et al. . |
| 5,339,612 | 8/1994 | Scott . |
| 5,355,667 | 10/1994 | Scott . |
| 5,421,149 * | 6/1995 | Littau ..................................... 56/330 |
| 5,428,947 | 7/1995 | Visser . |
| 5,647,194 * | 7/1997 | Scott et al. .......................... 56/328.1 |
| 5,904,034 * | 5/1999 | Youman et al. ..................... 56/328.1 |
| 5,956,933 | 9/1999 | Heard . |

* cited by examiner

Primary Examiner—Thomas B. Will
Assistant Examiner—Meredith C Petravick
(74) Attorney, Agent, or Firm—Allen, Dyer, Doppelt, Milbrath & Gilchrist, P.A.

(57) ABSTRACT

A fruit harvester includes a single shaker head having multiple, independently operable, shaker head segments freely rotatable about an axis of the head and moveable in a to and fro linear displacement. Each head segment includes a shaft and multiple finger elements radially extending from the shaft for penetrating fruit bearing branches of a tree. A shaker provides the radially linear displacement of the shaker head segment to and from the axis of the single shaker head. Adjacent shaker head segments are displaced in parallel and opposing directions for providing an oscillating movement to the finger elements, and thus a balance and stability to the shaker head during shaking movement of the tree branches. The shaker head is operable with a mobile carrier. A conveyor, also carried by the mobile carrier, is independently operable for receiving fruit falling from the tree and delivering the fruit onto a hauler. A flexible trunk seal is juxtaposed with the conveyor for assisting fruit falling from the tree to roll onto the conveyor. The flexible trunk seal is positioned for contacting the trunk in a sealing arrangement when operating with a similar and opposing fruit harvester. A hydraulic mechanism positions the conveyor and seal at a desirable distance from the trunk when a sensor sliding along the trunk activates the mechanism for lateral movement of the conveyor and seal in response to movement of the sensor, thus maintaining a desirable distance between the tree and fruit harvester.

42 Claims, 8 Drawing Sheets

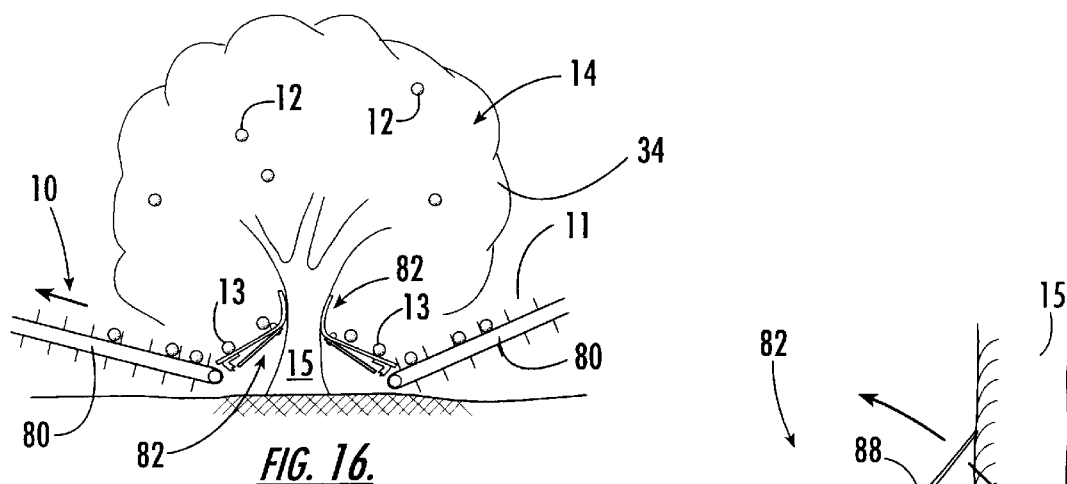
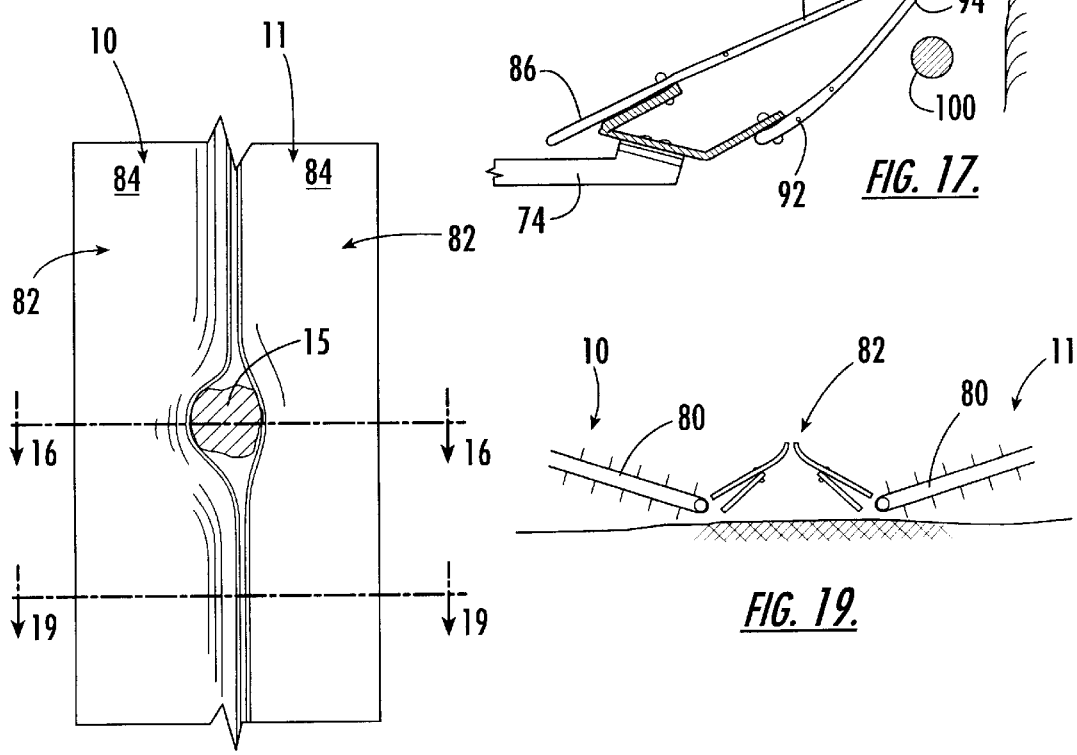
FIG. 16.
FIG. 17.
FIG. 18.
FIG. 19.

SINGLE SHAKER HEAD HARVESTING APPARATUS AND METHOD

CROSS REFERENCE TO RELATED APPLICATIONS

This application incorporates by reference and claims priority to Provisional Application Ser. No. 60/086,500 abandoned for "Fruit Harvester With Parallel Shaking Members," Provisional Application Ser. No. 60/086,589 abandoned for "fruit Catcher Collector," and Provisional Application Ser. No. 60/086,614 abandoned for "Improved Single Drum Harvester," each having a filing date of May 22, 1998, and each commonly owned with the instant invention.

FIELD OF THE INVENTION

The present invention relates generally to harvesters, and more particularly to harvesters operating so as to shake mature fruit from branches of a plant or tree.

BACKGROUND OF THE INVENTION

The use of spiked shaker head styled fruit harvesters is known in the art as illustrated by way of example with reference to U.S. Pat. No. 4,860,529 to Peterson et al. for "Shaking Mechanism For Fruit Harvesting" and U.S. Pat. No. 4,329,836 to Scudder for "Harvesting Units." However, problems using such spiked shaker head harvesting mechanisms include shaker head diameters being too small to sufficiently penetrate the canopy of a larger fruit bearing trees, especially those found in the citrus field. Further, simply increasing the diameter of the shaker head lowers the natural frequency of the finger elements which reduces the efficiency with which fruit can be shaken loose from their branches, and increases damage thereto. The diameter may be increased to offset the frequency problem, but the diameter would have to be exponentially increased to an impractical length. The harvester will be too big, too long, too wide and awkward to maneuver in a typical grove. Further, if the harvester were high enough to pick tall trees, its height would be too high for transporting, as limited by the DOT specifications for height of equipment traveling on highways. There is a need for a practical way to easily extend the spiked shaker heads and lower them for transport.

Dual shaker head systems are typically used in place of single shaker head systems to provide adequate balancing of the harvester during the oscillating or shaking movement of the shaker head. When inertia of the fruit is used to sever its connection to the fruit stem, the frequency must be of a high enough order of magnitude to generate the required forces to sever this connection. The frequency of a tree nicking action can be reduced when the shaker head displacement (amplitude) is increased. The benefit of a lower frequency provides for reduced damage to the tree, reduced stresses in harvester machine parts, increased durability, and reduced weight. Further, typical shaker head styled harvesters are typically rigid and long, and as such cannot be moved sideways to increase or decrease the penetration depth into the canopy. The rigid machine cannot get close enough to the scallop pockets between two adjacent trees in order to pick the fruit.

As described in the Peterson '529 patent, The spiked head shaker is preferred over other styled harvesters because the spikes, finger elements, can gently enter the fruiting canopy as the harvester moves along the tree rows, and the force of oscillation adjusted to shake ripe fruit loose from the branches without damaging the tree. However, there are inherent disadvantages of shaking a fruit tree with a pivoting, angular, and non-uniform displacement of the spikes. By way of example, a uniform movement having a pivot point off set in relation to the center of the shaker head imparts an angular movement although on a bigger radius, and consequently the tips of the spikes of the shaker head are displaced more than the center of the shaker head. Typically, the tip would have a 6 inch displacement and the center of the shaker head only 3 inch displacement. Therefore, the tips are more aggressively shaking the branches than the center of the shaker head. This results in an extremely aggressive movement of the tips while the central part of the shaker head is not aggressive enough to remove fruit. There is a need for a more uniform translation or movement along the length of the spikes rather than the typical angular displacement which results in the differing linear displacement along the shaking members. Further, it is believed that a single shaker head harvester has the ability to remove fruit as efficiently as a double shaker head machine, but there is a need for improved balancing of a single shaker head harvester.

It is typical for a fruit harvester to operate with a catcher floor adapter to straddle and travel along a row of plants, as described, by way of example, in U.S. Pat. No. 3,772,866 to Sell, for "Apparatus For Harvesting Grapes." Integrating the fruit shaker with a collector comes with some disadvantages, and as a result, a collector operated independently from the shaker is desirable. By way of example, maneuvering the harvester becomes easier, especially with harvesters having a three point mounted system for the shaker, and harvesters typically drawn by the same tractor that operates with the collector. There is a need for a collector to have versatility when negotiating tight turning radii, to have adjustment capability for horizontal and vertical movement that would enable it to be effectively positioned under the tree to catch and convey the fruit.

Further, when using left and right handed collectors in combination, there is a need for a continuous seal therebetween that enables the harvester to intercept and catch the fruit falling from the tree without losing fruit as the harvester moves along and brushes by the trees being harvested. It would further be desirable for the collector to separate debris from fruit before being discharged for transporting of the fruit.

SUMMARY OF INVENTION

In view of the foregoing background, it is therefore an object of the present invention to provide a balanced single shaker head harvester which provides a shaking action for harvesting fruit from fruit bearing branches without damage to the branches or tree. It is further an object of the invention to effectively and efficiently collect the fruit once shaken from the tree.

These and other objects, features, and advantages of the invention, are provided by a fruit harvester comprising a single shaker head having a plurality of shaker head segments aligned along a shaker head axis for rotation generally about the axis and linear radial displacement therefrom. Each shaker head segment is operable for independent movement and includes a shaft and a plurality of flexible finger elements rotatably carried by and radially extending from the shaft for penetrating fruit bearing branches of a tree. A plurality of shakers are operable with the single shaker head, wherein each one of the plurality of shakers is operable with one of the plurality of shaker head segments for providing a radially linear displacement of the shaker head segment to and from the axis of the single shaker head, and wherein adjacent shaker head segments are displaced in parallel and opposing directions for providing an oscillating movement to the plurality of finger elements, and thus providing balance and stability to the shaker head during shaking movement of tree branches being harvested.

In one embodiment, each of the plurality of shakers comprises a housing fixedly attached to a rigid arm extending from the frame, a plate having an aperture therein for rotatably receiving the shaft of the shaker head segment therethrough, a pair of lever arms pivotally attached between the housing and the plate for limiting movement of the aperture along a straight line extending from the axis of the rigid arm, and a crank assembly operable with an elongate rod rotatable attached to the plate for providing the to and fro movement to the plate.

In another embodiment, each of the plurality of shakers comprises a straight raceway formed at the distal end of a rigid rod extending from the frame, a carriage slidably carried by the raceway for providing a linear to and fro movement of the carriage along the raceway, wherein the shaft of the shaker head segment is rotatably carried by the carriage, and a crank assembly operable with an elongate rod rotatably attached to the carriage for providing the to and fro movement to the carriage.

In one preferred embodiment of the present invention, the plurality of shaker head segments includes three pairs of shaker head segments, and each of the pairs of shaker head segments is operable for providing the parallel and opposing displacing movement to the shaker head segments within the pair, and wherein the three pairs of shaker head segments operate independently of the other pairs.

In one embodiment, the finger elements are carried within an elongate rigid sleeve extending from a disk for receiving the finger element therein. The rigid sleeves sufficiently cover each finger element for providing rigidity to an axial portion of the finger element. In an alternate embodiment, the finger elements within each shaker head segment are attached to the shaft in a helical pattern, and adjoining shaker head segments have the helical pattern of finger elements arranged for providing a continuous helical pattern from a top portion of the shaker head to a bottom portion thereof.

A preferred embodiment includes the frame rotatably carried by a mobile carrier for movement from an operating position to a transporting position. A conveyor is carried by the mobile carrier for receiving fruit falling from the tree and delivering the fruit outwardly therefrom. A flexible trunk seal is juxtaposed with the conveyor for assisting fruit falling from the tree proximate a trunk of the tree being harvested to roll onto the conveyor. The flexible trunk seal is positioned for contacting the trunk in a sealing arrangement when operating with a similar and opposing fruit harvester.

A trunk sensor is operable with positioning means for positioning the conveyor and seal at a desirable distance from the trunk. One embodiment of the trunk sensor includes an elongate sensing rod extending in spaced relation from the mobile carrier and longitudinally along a direction of travel of the mobile carrier. The elongate sensing rod is operable for slidably biasing against the trunk and activating the positioning means for providing lateral movement of the conveyor and seal in response to movement of the sensing rod.

A method aspect of the invention includes the steps of providing a single shaker head having a plurality of shaker head segments aligned along an axis for freely rotating thereabout, each shaker head segment having a shaft and a plurality of flexible finger elements rotatably carried by and radially extending from the shaft for penetrating fruit bearing branches of a tree, extending the single shaker head, and thus the plurality of flexible finger elements into branches of a tree to be harvested, and independently displacing each axis of the shaker head segments in a linear to and fro manner from the axis of the shaker head, wherein adjacent shaker head segments are displaced in parallel and opposing directions for providing an oscillating movement to the plurality of finger elements for providing balance and stability to the shaker head during shaking movement of tree branches being harvested.

BRIEF DESCRIPTION OF THE DRAWINGS

A preferred embodiment of the invention, as well as alternate embodiments are described by way of example with reference to the accompanying drawings in which:

FIG. 16 is a partial cross-section view taken through lines 16—16 of FIG. 18, illustrating a conveyor and seal arrangement of the present invention;

FIG. 17 is a partial cross-section view taken through lines 17—17 of FIG. 16;

FIG. 18 is a partial top plan view of FIG. 16; and

FIG. 19 is a partial cross-section view taken through lines 19—19 of FIG. 18.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
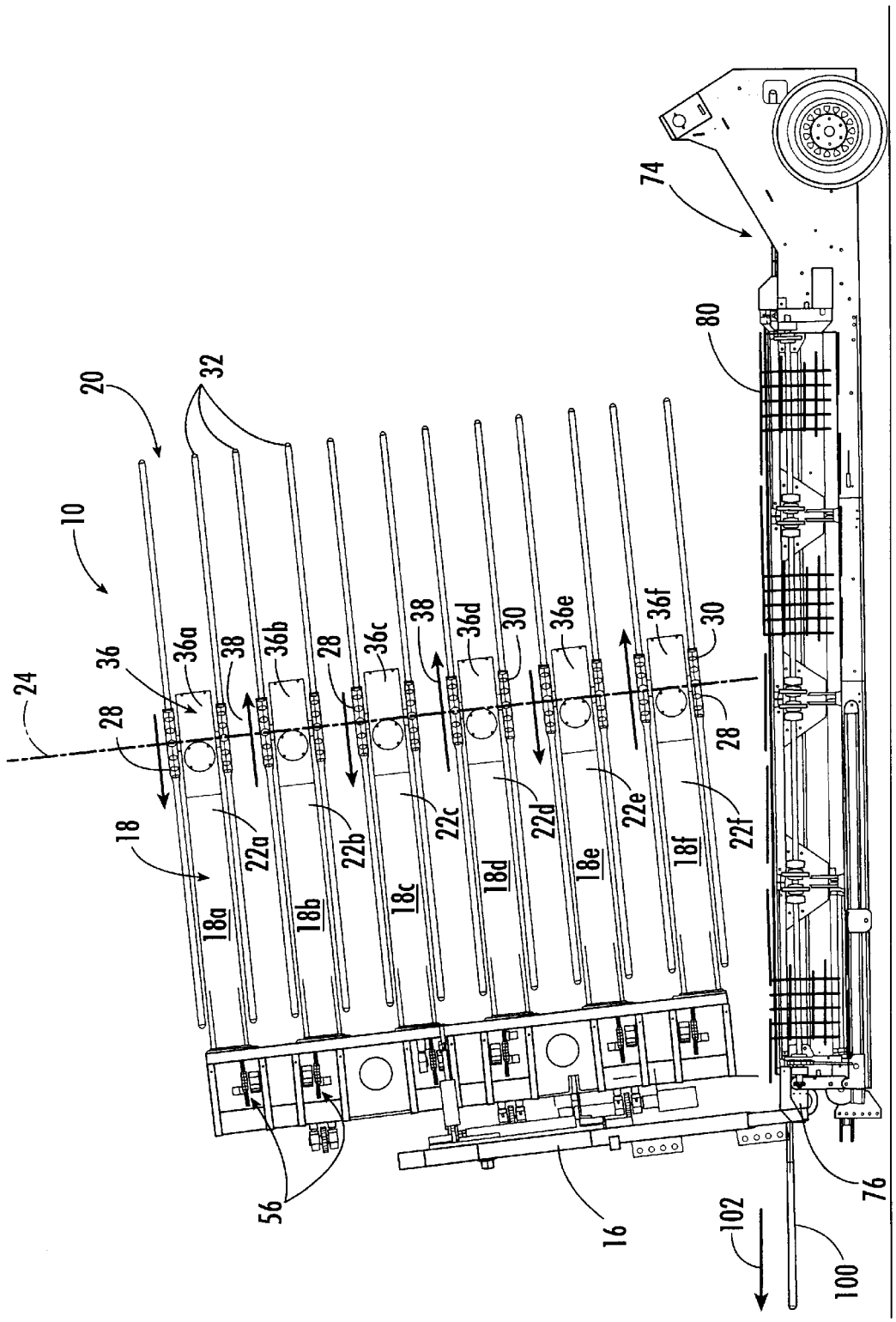
FIG. 1 is a side elevation view of a fruit harvester according to the present invention.
Figure 2:
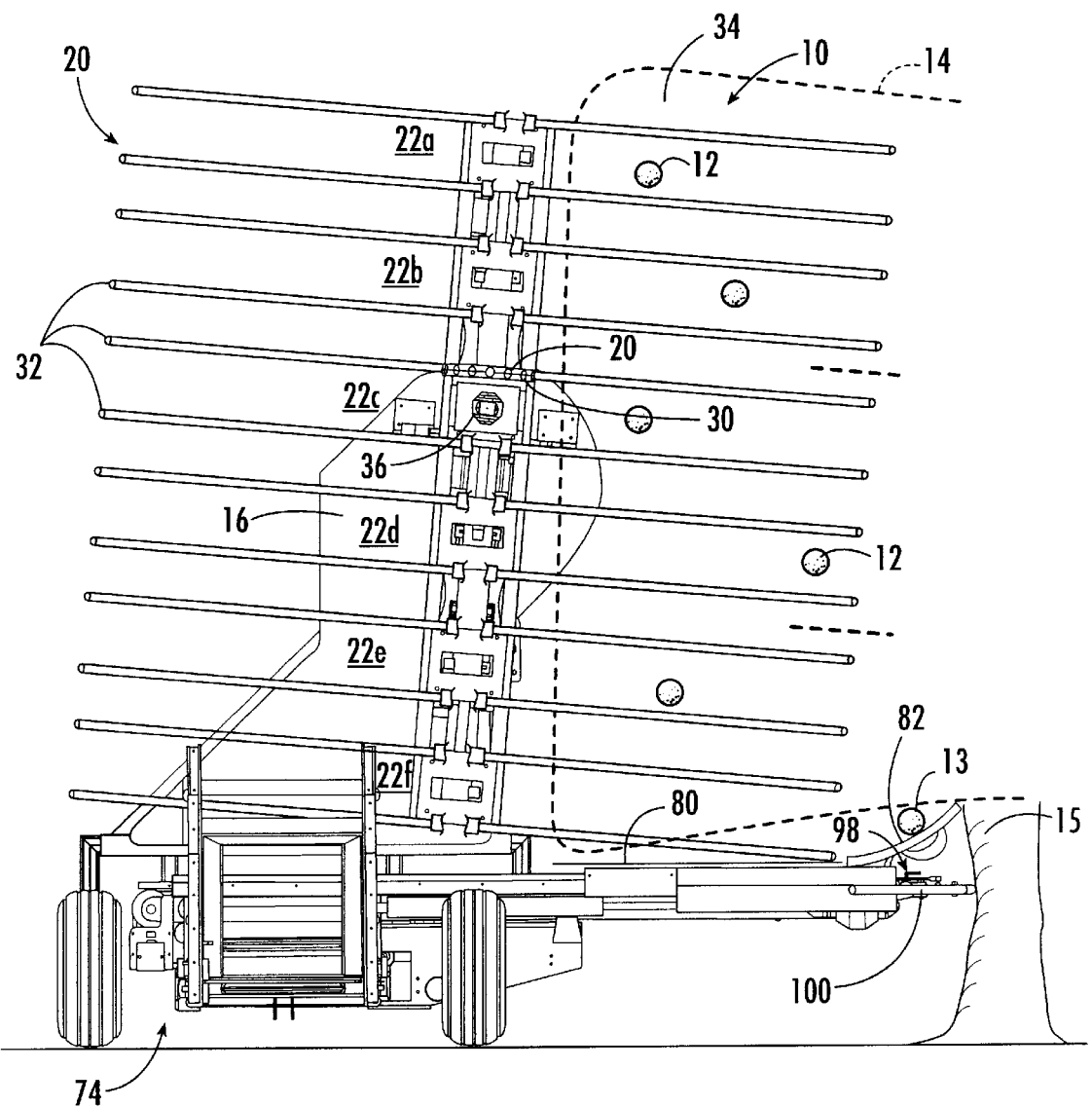
FIG. 2 is an end view of the harvester of FIG. 1.
Figure 3:
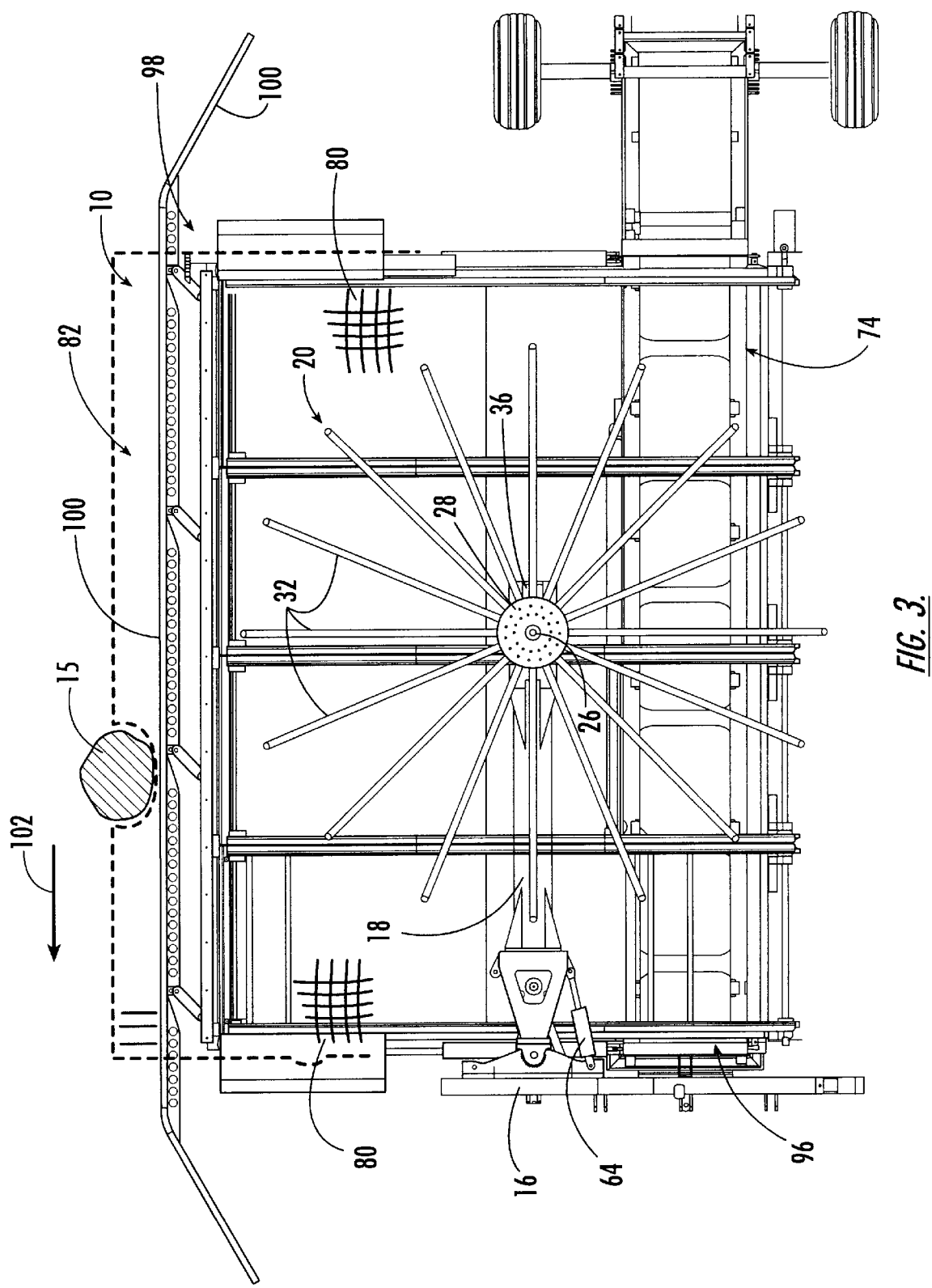
FIG. 3 is a top plan view of the harvester of FIG. 1.

With reference initially to FIGS. 1–3, one preferred embodiment of the present invention is a fruit harvester 10 for shaking fruit 12 from trees 14. The fruit harvester 10 comprises a frame 16 having an elongate rigid arm 18 comprising multiple arms extending from the frame and herein illustrated by numerals 18a, 18b, 18c, 18d, 18e, and 18f with reference to FIG. 1, by way of example. The elongated rigid arm 18 support a single shaker head 20, often referred to in the art as a drum, operable with the elongate rigid arm 18 for outwardly extending the shaker head 20 from the frame 16. The single shaker head 20 comprises six shaker head segments 22, generally aligned along a shaker head axis 24 for rotation generally about the axis and linear radial displacement therefrom.

Each shaker head segment, herein referred to by numerals 22a, 22b, 22c, 22d, 22e, and 22f is independently movable, and has a shaft 26. As illustrated with reference again to FIGS. 1–3, a disk 28 having a plurality of apertures 30 extending radially outward from an axis of the disk. Finger elements 32 are held within the apertures 30 for freely rotating about the segment shaft 26. Each of the plurality of finger elements 32 in carried within each of the plurality of apertures 30, respectively and radially extend from their respective segment shaft 26 for penetrating fruit bearing branches 34 of the tree 14.

A plurality of shakers 36, herein referred to as numerals 36a, 36b, 36c, 36d, 36e, and 36f, are operable with each one of the plurality of shaker head segments 22a, 22b, 22c, 22d, 22e, and 22f, respectively for providing a radially linear displacement of the shaker head segment 22 to and from the axis 24 of the single shaker head 20. In a preferred operation of the single shaker head 20, adjacent shaker head segments are displaced in parallel and opposing directions as indicated by direction arrows 38 for providing an oscillating movement to the plurality of finger elements 32 and balance and stability to the shaker head 20 during shaking movement of tree branches 34 being harvested.

Figure 4:
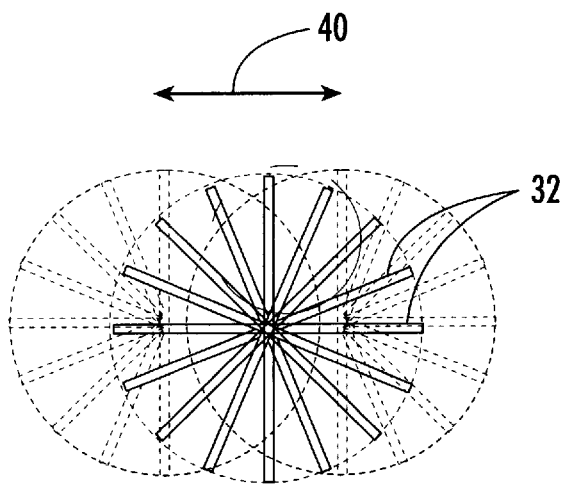
FIG. 4 is a partial top view of a single shaker head according to the present invention.
Figure 5:
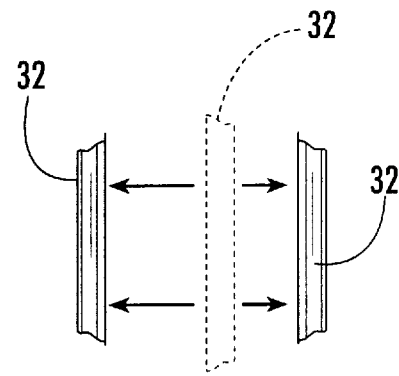
FIG. 5 is a partial section view of a finger element illustrating a straight displacement according to the present invention.
Figure 6:
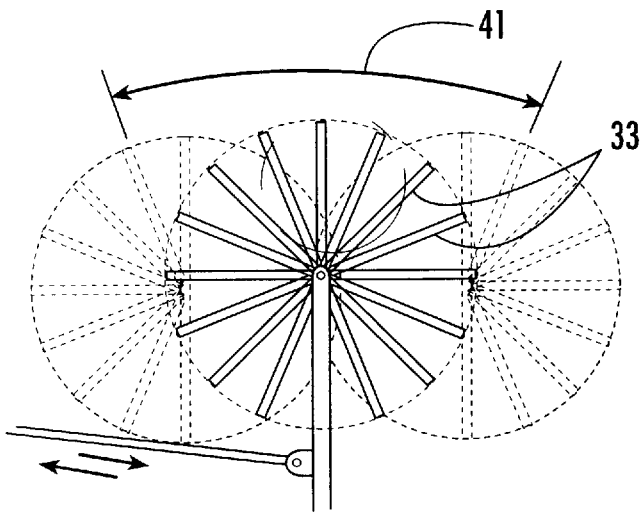
FIG. 6 is a partial top view of a well known single shaker head.
Figure 7:
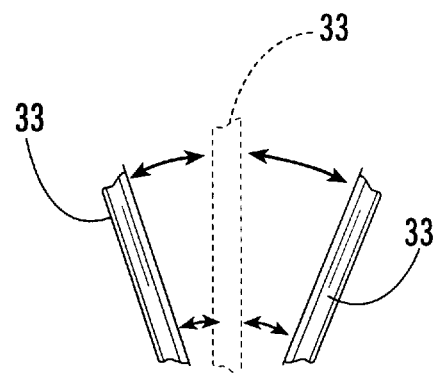
FIG. 7 is a partial section view of a finger element illustrating an angular movement typically found in the harvesting art of shaking trees.

In the embodiment herein described, the six shaker head segments 22 are operated in pairs or three 22a and 22b, 22c and 22d, and 22e and 22f, with each of the pairs of shaker head segments providing the parallel and opposing displacing movement to the shaker head segments within the respective pair, and wherein the three pairs of shaker head segments operate independently of the other pairs. Such to and from movement of the shaker head segments 22 results in a generally uniform and equal displacement 40 of the finger elements, as illustrated with reference to FIGS. 4 and 5. Such displacement 40, a linear movement of the fruit shaking finger elements 32, results in an aggressiveness throughout and provides an opportunity for selecting a desired combination of frequency and amplitude of the movement under varying harvesting conditions to optimize the harvesting, increase the percentage of fruit picked, while minimizing damage to the fruit and trees. It has been found that tree damage to major limbs is dramatically reduced when compared to traditional shaking methods that include an angular movement 41 of the shaker head 21, and thus the finger elements 33, as illustrated with reference to FIGS. 6 and 7, by way of example. The time needed to shake fruit loose from a given tree is reduced, thus reducing the time needed to harvest a grove.

Figure 8:
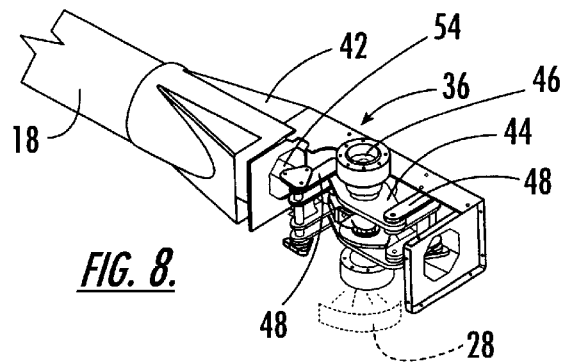
FIG. 8 is a perspective view of a shaker in accordance with the present invention.
Figure 9:
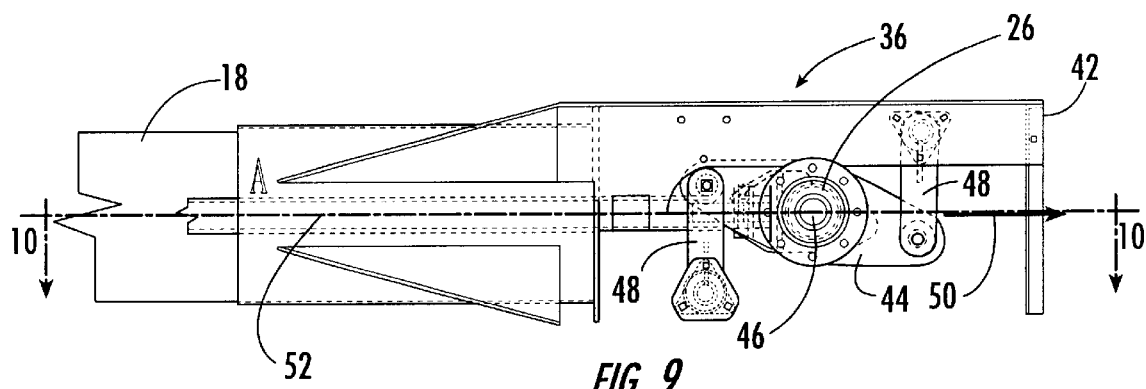
FIG. 9 is a top plan view of FIG. 8.
Figure 10:
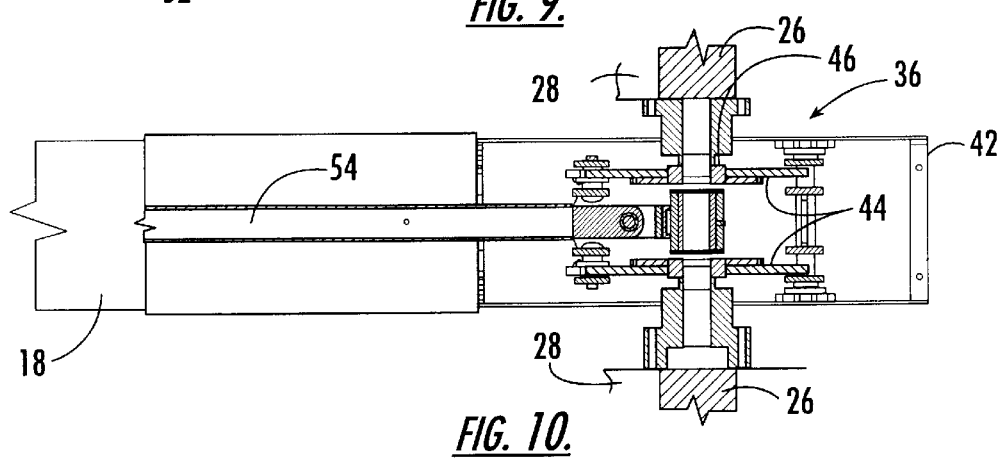
FIG. 10 is a cross-section view taken through lines 10—10 of FIG. 9.

In a preferred embodiment of the fruit harvester 10, and as illustrated with reference to FIGS. 8–10 each of the shakers 36 comprises a housing 42 affixed to the rigid arm 18. A pair of plates 44 include aperture 46 for rotatably receiving the shaft 26 of the shaker head segment 22 therethrough, herein including a bushing for providing the free rotation of the shaft within the aperture. A pair of lever arms 48 are pivotally attached between the housing 42 and the plates 44 for limiting movement 38 of the aperture 46, and thus the shaft 26, along a straight line 50 extending from the longitudinal axis 52 of the rigid arm 18. An elongate rod 54 is rotatable attached to the plate 44, and driven by a crank assembly 56, seen with reference again to FIG. 1, operable with the elongate rod for providing the to and fro movement to the plate.

Figure 11:
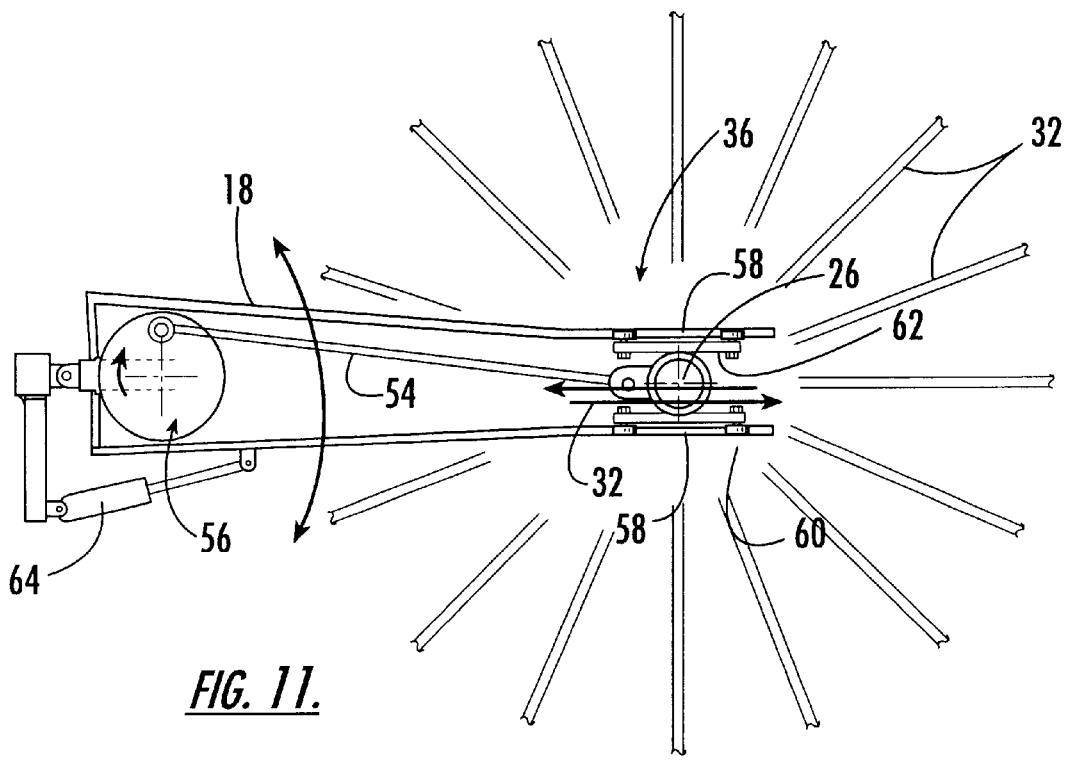
FIGS. 11 and 12 are top and side views illustrating an alternate embodiment of the shaker of FIG. 8.
Figure 12:
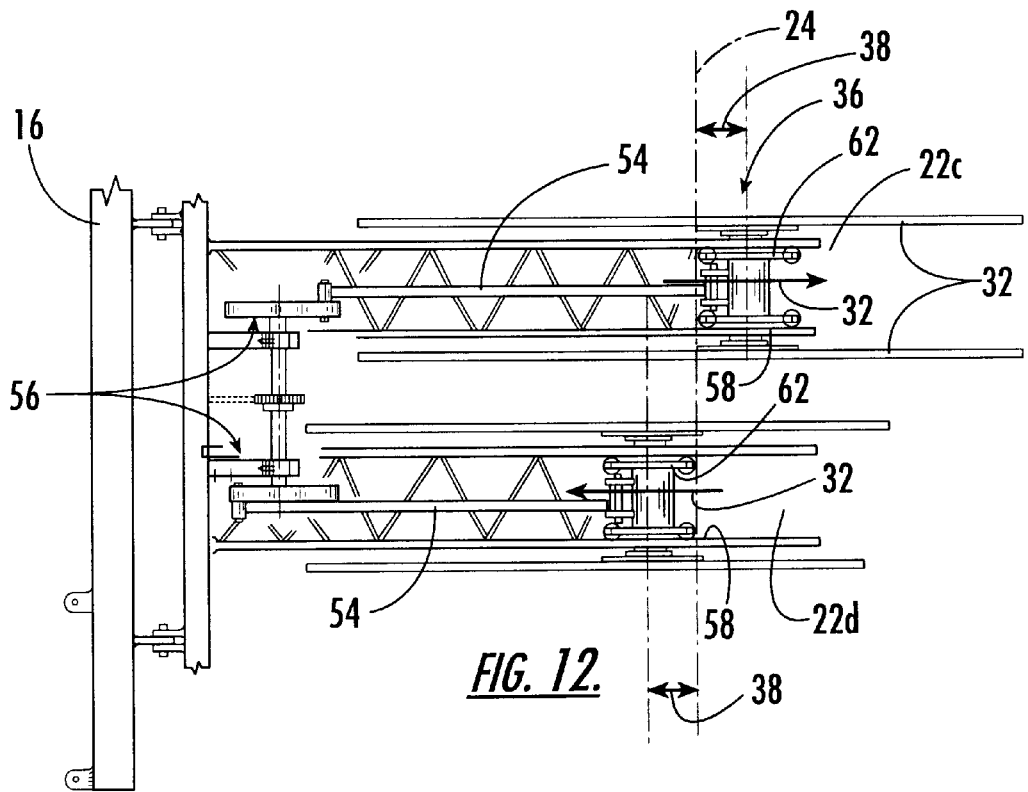

In an alternate embodiment, and as illustrated with reference to FIGS. 11 and 12, the shaker comprises a straight raceway 58 formed at the distal end of the rigid arm 18. A carriage 62 is slidably carried by the raceway 58 for the straight line, to and fro movement 38 of the carriage along the raceway, wherein the shaft 26 of the shaker head segment 22 is rotatably carried by the carriage. The elongate rod 54 is rotatably attached to the carriage, and as earlier described with reference to FIG. 8, driven by the crank assembly 56 which provides the to and fro movement 38 to the carriage 62. As illustrated with reference to FIGS. 1 and 11, various crank assemblies can be selected to provide a rotational to linear movement desired for the shaker.

Figure 13:
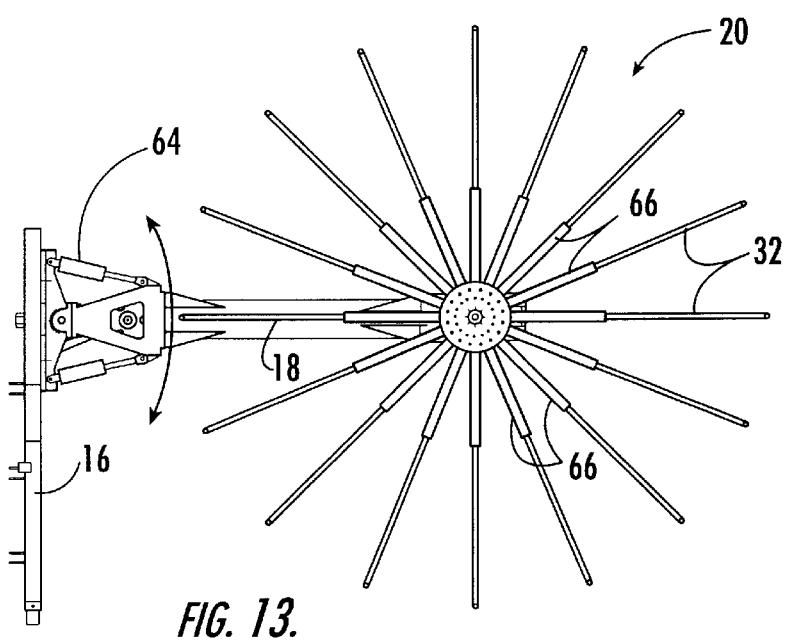
FIG. 13 is a partial top plan view of a shaker head segment.
Figure 14:
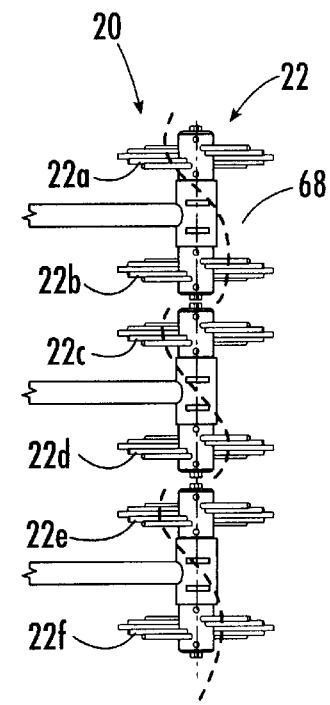
FIG. 14 is a partial elevation view illustrating an alternate arrangement of finger elements.

As illustrated with reference again to FIGS. 3 and 11, by way of example, each elongate rigid arm 18 is pivotally attached to the frame 16 and a hydraulic mechanism 64 included for placing the shaker head 20 at a desired orientation. As illustrated with reference to FIG. 13, by way of example, an alternate embodiment includes the reinforcing of each finger element 32 with an elongate rigid sleeve 66 extending from the disk 28 for receiving the finger element therein. The rigid sleeve 66 will sufficiently covering the finger element 32 for providing a desired rigidity to the finger elements without the need to replace them with larger, more costly and heavier elements. In yet another embodiment, and as illustrated with reference to FIG. 14, the finger elements 32 within each shaker head segment 22 are in a helical pattern 68, providing a continuous helical pattern from the top 70 to the bottom 72 of the shaker head 20.

Figure 15:
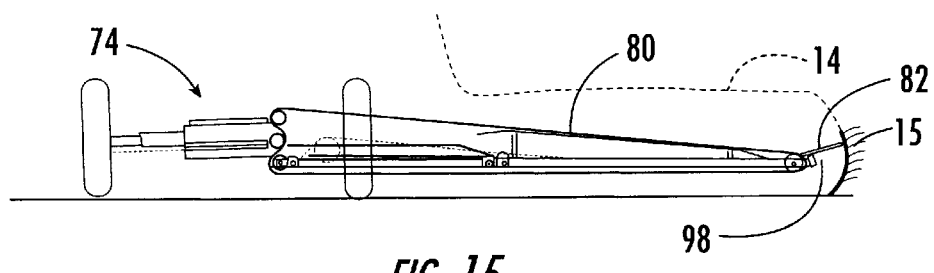
FIG. 15 is a partial end view of embodiment of FIG. 1, illustrating details of the conveyor and seal of the present invention.

As illustrated with reference again to FIGS. 1–3, the harvester 10 of the present invention, herein described by way of example, includes a mobile carrier 74, wherein the frame 16 is rotatable for movement about a pivot from an operating position 76, with the shaker head 20 having its axis 24 in a generally vertical position, to a transporting position, having the axis in a generally horizontal position. As illustrated with reference again to FIG. 1 and to FIG. 15, a conveyor 80 is carried by the mobile carrier 74 for receiving the fruit 13 falling from the tree 14 and delivering the fruit outwardly from the tree for transporting. A flexible seal 82 is positioned for assisting fruit 13 falling from the tree 14 proximate a trunk 15 to roll onto the conveyor 80. The flexible seal 82 is positioned for contacting one half of the tree trunk 15 in a sealing arrangement when operating with a similar and opposing fruit harvester 11 in a left handed and right handed arrangement, as illustrated with reference to FIG. 16.

As illustrated with reference again to FIGS. 1, 2 and 16, and to FIGS. 17–19, one preferred embodiment of the seal 82 comprises an elongate top flexible sheet 84 having a proximal end 86 attached to the mobile carrier 74 and a distal end 88 for sealable engagement with the trunk 15 of the tree 14. A bottom flexible sheet 90, herein generally extending along the top sheet 84, includes a proximal end 92 attached to the mobile carrier 74 at a location spaced from the top flexible sheet proximal end 86, and a distal end 94 attached to the top flexible sheet distal end 88, with allowance for the extreme end portion of the top sheet 84 to make the sealing contact with the trunk 15. The top sheet 84 has a greater flexibility than the bottom sheet 90, and the sheets are attached wherein the top flexible sheet is placed under tension and the bottom flexible sheet is under compression for providing a seal that sufficiently supports downward forces from falling fruit yet provides a desirable seal that is sufficiently flexible for sealing engagement with the trunk, as illustrated with reference again to FIG. 18.

With reference again to FIGS. 1–3, the embodiment, herein described includes hydraulics 96 for positioning, independently from any movement of the shaker head 20, the conveyor 80 and seal 82 toward and away from the trunk 15 for providing a desirable seal and for avoiding damage to the tree by unnecessary contact with the harvester as the harvester is maneuvered between and among the rows of trees typically found in a fruit tree grove. A trunk sensor 98 is operable with the hydraulics 96 for providing a signal thereto which limiting spacing between the conveyor and trunk. In a preferred embodiment, the sensor 98 comprises an elongate sensing rod 100 extending in spaced relation from the mobile carrier 74 and longitudinally along a direction of travel 102 of the mobile carrier. The elongate sensing rod 100 is pivotally attached to the carrier and operable for slidably biasing against the trunk 15, and activating the hydraulics 96 for providing lateral movement of the conveyor 80 and seal 82 in response to movement of the sensing rod being moved. The conveyor 80 in the preferred embodiment herein described includes a mesh belt having a mesh opening small enough to collect mature fruit yet large enough to allow a significant amount of debris falling from the shaken branches to pass through the mesh openings.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

That which is claimed is:

1. A fruit harvester for shaking fruit from trees, the fruit harvester comprising:
    a frame having an elongate rigid arm extending therefrom;
    a single shaker head operable with the elongate rigid arm for outwardly extending the shaker head from the frame, the single shaker head having a plurality of shaker head segments generally aligned along a shaker head axis for rotation generally about the axis and linear radial displacement therefrom, each shaker head segment operable for independent movement, each shaker head segment having a shaft and a plurality of flexible finger elements rotatably carried by and radially extending from the shaft for penetrating fruit bearing branches of a tree; and
    a plurality of shakers operable with the single shaker head, wherein each one of the plurality of shakers is operable with one of the plurality of shaker head segments for providing a radially linear displacement of the shaker head segment to and from the axis of the single shaker head, the adjacent shaker head segments displaced in parallel and opposing directions for providing an oscillating movement to the plurality of finger elements for providing balance and stability to the shaker head during shaking movement of tree branches being harvested.

2. The fruit harvester according to claim 1, wherein each of the plurality of shakers comprises:
    a housing affixed to the rigid arm;
    a plate having an aperture therein for rotatably receiving the shaft of the shaker head segment therethrough;
    a pair of lever arms pivotally attached between the housing and the plate for limiting movement of the aperture along a straight line extending from the axis of the rigid arm;
    an elongate rod rotatable attached to the plate; and
    a crank assembly operable with the elongate rod for providing the to and fro movement to the plate.

3. The fruit harvester according to claim 1, wherein each of the plurality of shakers comprises:
    a straight raceway formed at the distal end of the rigid arm;
    a carriage slidably carried by the raceway for a linear to and fro movement of the carriage along the raceway, wherein the shaft of the shaker head segment is rotatably carried by the carriage;
    an elongate rod rotatably attached to the carriage; and
    a crank assembly operable with the elongate rod for providing the to and fro movement to the carriage.

4. The fruit harvester according to claim 1, wherein the elongate rigid arm is pivotally attached to the frame and wherein the harvester further includes means for placing the shaker head at a predetermined orientation to the frame.

5. The fruit harvester according to claim 1, wherein the plurality of shaker head segments includes three pairs of shaker head segments, and each of the pairs of shaker head segments is operable for providing the parallel and opposing displacing movement to the shaker head segments within the pair, and wherein the three pairs of shaker head segments operate independently of the other pairs.

6. The fruit harvester according to claim 1, further comprising a disk having a plurality of apertures extending radially outward from an axis of the disk, the disk receiving the shaft of the shaker head segment for free rotation of the disk about the shaft, and wherein each of the plurality of finger elements in carried within each of the plurality of apertures, respectively.

7. The fruit harvester according to claim 6, further comprising an elongate rigid sleeve extending from the aperture of the disk for receiving the finger element therein, the rigid sleeve sufficiently covering the finger element for providing rigidity to an axial portion of the finger element.

8. The fruit harvester according to claim 1, wherein the finger elements within each shaker head segment are attached to the shaft in a helical pattern.

9. The fruit harvester according to claim 8, wherein adjoining shaker head segments have the helical pattern of finger elements arranged for providing a continuous helical pattern from a top portion of the shaker head to a bottom portion thereof.

10. The fruit harvester according to claim 1, wherein the elongate rigid arm comprises a plurality of rigid arms, wherein each of the plurality of rigid arms supports one of the plurality of shaker head segments.

11. The fruit harvester according to claim 1, further comprising a mobile carrier, wherein the frame is rotatably carried by the mobile carrier for movement from an operating position to a transporting position.

12. The fruit harvester according to claim 11, further comprising:
   a conveyor carried by the mobile carrier for receiving fruit falling from the tree and delivering the fruit outwardly therefrom;
   a flexible trunk seal juxtaposed with the conveyor for assisting fruit falling from the tree proximate a trunk of the tree being harvested to roll onto the conveyor, the flexible trunk seal positioned for contacting the trunk in a sealing arrangement when operating with a similar and opposing fruit harvester.

13. The fruit harvester according to claim 12, wherein the flexible trunk seal comprises:
   a top flexible sheet having a proximal end attached to the mobile carrier and a distal end for sealable engagement with the trunk of the tree; and
   a bottom flexible sheet having a proximal end attached to the mobile carrier at a location spaced from the top flexible sheet proximal end, and a distal end attached to the top flexible sheet distal end, wherein the top sheet has a greater flexibility than the bottom sheet, and wherein the top flexible sheet is placed under tension and the bottom flexible sheet is under compression for providing a seal that sufficiently supports downward forces from fruit yet providing a seal that is sufficiently flexible for sealing engagement with the trunk.

14. The fruit harvester according to claim 12, further comprising:
   positioning means for positioning the conveyor and seal in an operable position with the trunk; and
   a trunk sensor operable with the positioning means for limiting spacing between the conveyor and trunk.

15. The fruit harvester according to claim 14, wherein the trunk sensor comprises an elongate sensing rod extending in spaced relation from the mobile carrier and longitudinally along a direction of travel of the mobile carrier, the elongate sensing rod operable for slidably biasing against the trunk and activating the positioning means for providing lateral movement of the conveyor and seal in response to movement of the sensing rod.

16. A harvester comprising:
   a shaker head having a plurality of shaker head segments aligned along an axis of the shaker head for rotation thereabout and linear radial displacement therefrom, each shaker head segment having a shaft and a plurality of flexible finger elements rotatably carried by and radially extending from the shaft for penetrating branches of a plant; and
   a shaker operable with the plurality of shaker head segments for providing a radially linear displacement of each of the plurality of shaker head segments in a to and fro movement with the axis of the shaker head, and the adjacent shaker head segments displaced in parallel and opposing directions for providing an oscillating movement to the plurality of finger elements.

17. The harvester according to claim 16, wherein the shaker comprises:
   a housing;
   a plate having an aperture therein for rotatably receiving the shaft of the shaker head segment therethrough;
   a pair of lever arms pivotally attached between the housing and the plate for limiting movement of the aperture along a straight line;
   an elongate rod rotatable attached to the plate; and
   a crank assembly operable with the plate for providing the to and fro movement thereto.

18. The harvester according to claim 16, wherein the shaker comprises:
   a straight raceway;
   a carriage slidably carried by the raceway for a linear to and fro movement of the carriage along the raceway, the shaft of the shaker head segment is rotatably carried by the carriage;
   a crank assembly operable with the carriage for providing the to and fro movement thereto.

19. The harvester according to claim 16, wherein the plurality of shaker head segments includes three pairs of shaker head segments, wherein each of the pairs of shaker head segments is operable for providing the parallel and opposing displacing movement to the shaker head segments within the pair, and wherein the three pairs of shaker head segments operate independently of the other pairs.

20. The harvester according to claim 16, further comprising a disk having a plurality of apertures extending radially outward from an axis of the disk, the disk receiving the shaft of the shaker head segment for free rotation of the disk about the shaft, and wherein each of the plurality of finger elements in carried within each of the plurality of apertures, respectively.

21. The harvester according to claim 16, wherein each of the finger elements comprises an elongate rigid sleeve sufficiently covering the finger element for providing rigidity thereto.

22. The harvester according to claim 16, wherein the finger elements form a helical pattern about the axis of the shaker.

23. The harvester according to claim 16, further comprising a mobile carrier, wherein the shaker head is rotatably carried thereby for movement from an operating position to a transporting position.

24. The harvester according to claim 23, further comprising:
   a conveyor carried by the mobile carrier for receiving harvested product falling from the plant and delivering the product outwardly therefrom;
   a flexible trunk seal juxtaposed with the conveyor for assisting fruit falling from the plant being harvested to roll onto the conveyor, the flexible trunk seal positioned for contacting the trunk in a sealing arrangement when operating with a similar and opposing fruit harvester.

25. The harvester according to claim 24, wherein the flexible trunk seal comprises:
   a top flexible sheet having a proximal end attached to the mobile carrier and a distal end for sealable engagement with the trunk of the tree; and
   a bottom flexible sheet having a proximal end attached to the mobile carrier at a location spaced from the top flexible sheet proximal end, and a distal end attached to the top flexible sheet distal end, wherein the top sheet has a greater flexibility than the bottom sheet.

26. The harvester according to claim 24, further comprising:
   positioning means for positioning the conveyor and seal in an operable position with the trunk; and
   a trunk sensor operable with the positioning means for limiting spacing between the conveyor and trunk.

27. The harvester according to claim 26, wherein the trunk sensor comprises an elongate sensing rod extending in spaced relation from the mobile carrier and longitudinally along a direction of travel of the mobile carrier, the elongate sensing rod operable for slidably biasing against the trunk and activating the positioning means for providing lateral movement of the conveyor and seal in response to movement of the sensing rod.

28. A harvesting method comprising the steps of:

providing a single shaker head having a plurality of shaker head segments aligned along an axis for freely rotating thereabout;

providing each shaker head segment with a shaft and a plurality of flexible finger elements rotatably carried by and radially extending from the shaft for penetrating fruit bearing branches of a tree;

extending the single shaker head, and thus the plurality of flexible finger elements into branches of a tree to be harvested; and independently displacing each axis of the shaker head segments in a linear to and fro manner from the axis of the shaker head, wherein adjacent shaker head segments are displaced in parallel and opposing directions for providing an oscillating movement to the plurality of finger elements for providing balance and stability to the shaker head during shaking movement of tree branches being harvested.

29. The harvesting method according to claim 28, wherein the displacing step comprises the step of providing a plurality of shakers, each one of the plurality of shakers operable with one of the plurality of shaker head segments for providing the radially linear displacement of the shaker head segment.

30. The harvesting method according to claim 29, wherein each of the plurality of shakers comprises:

a housing affixed to a rigid arm;

a plate having an aperture therein for rotatably receiving the shaft of the shaker head segment therethrough;

a pair of lever arms pivotally attached between the housing and the plate for limiting movement of the aperture along a straight line extending from the axis of the rigid arm;

an elongate rod rotatable attached to the plate; and a crank assembly operable with the elongate rod for providing the to and fro movement to the plate.

31. The harvesting method according to claim 29, wherein each of the plurality of shakers comprises:

a straight raceway formed at the distal end of the rigid arm;

a carriage slidably carried by the raceway for a linear to and fro movement of the carriage along the raceway, wherein the shaft of the shaker head segment is rotatably carried by the carriage;

an elongate rod rotatably attached to the carriage; and a crank assembly operable with the elongate rod for providing the to and fro movement to the carriage.

32. The harvesting method according to claim 28, further comprising the step of pivotally attaching the shaker head to a frame for placing the shaker head at a predetermined orientation to the frame.

33. The harvesting method according to claim 32, further comprising the step of attaching each of the plurality of shaker segments to an elongate rigid arm for extending the shaker head from the frame.

34. The harvesting method according to claim 28, further comprising the steps of:

providing three pairs of shaker head segments; and operating each of the pairs of shaker head segments for providing the parallel and opposing displacing movement to the shaker head segments within the pair.

35. The harvesting method according to claim 28, further comprising the steps of:

providing a disk having a plurality of apertures extending radially outward from an axis of the disk;

attaching the disk to the shaft of the shaker head segment for free rotation of the disk about the shaft; and placing each of the plurality of finger elements into each of the plurality of apertures, respectively.

36. The harvesting method according to claim 28, further comprising the step of partially enclosing each of the plurality of finger elements within a rigid sleeve for providing rigidity thereto.

37. The harvesting method according to claim 28, further comprising the steps of placing the plurality of finger elements in a helical pattern about the axis of the shaker head.

38. The harvesting method according to claim 28, further comprising the steps of providing a mobile carrier for operating the single shaker head therefrom, and for movement of the shaker head from an operating position to a transporting position.

39. The harvesting method according to claim 28, further comprising the steps of:

providing a conveyor for receiving fruit falling from the tree and delivering the fruit outwardly therefrom;

providing a flexible trunk seal juxtaposed with the conveyor for assisting fruit falling from the tree being harvested to roll onto the conveyor; and positioning the trunk seal in a sealing arrangement with the trunk when operating with a similar and opposing fruit harvester.

40. The harvesting method according to claim 39, wherein the step of providing the flexible trunk seal comprises the steps of:

providing a top flexible elongate sheet having a distal end for sealable engagement with the trunk of the tree;

providing a bottom flexible sheet; and attaching proximal and distal ends of the bottom sheet to a proximal and the distal ends of the top elongate sheet, respectively, for placing the top flexible sheet under tension and the bottom flexible sheet under compression for providing a seal that sufficiently supports downward forces from fruit yet is sufficiently flexible for sealing engagement with the trunk.

41. The harvesting method according to claim 39, further comprising the steps of:

positioning the conveyor and seal in an operable position with the trunk; and sensing the distance from the conveyor and seal;

adjusting the position of the conveyor and seal based on the sensed distance.

42. The harvesting method according to claim 41, wherein the sensing step comprises the steps of:

extending an elongate rod in spaced relation from the conveyor, longitudinally along a direction of travel for harvesting the fruit;

slidably biasing the elongate rod against the trunk; and providing lateral movement of the conveyor and seal in response to movement of the elongate rod.

* * * * *